United States Patent [19]

Washabaugh

[11] 4,373,037
[45] Feb. 8, 1983

[54] ASBESTOS-FREE FRICTION MATERIAL INCORPORATING ATTAPULGITE CLAY

[75] Inventor: Frank J. Washabaugh, Titusville, N.J.

[73] Assignee: Engelhard Corporation, Edison, N.J.

[21] Appl. No.: 268,510

[22] Filed: May 29, 1981

[51] Int. Cl.³ .............................................. C08L 61/00
[52] U.S. Cl. .................................... 523/155; 523/156; 524/445
[58] Field of Search ................ 260/38, 998.13, 37 M; 523/155, 156; 524/445

[56] References Cited

U.S. PATENT DOCUMENTS

| | | | |
|---|---|---|---|
| 3,835,118 | 9/1974 | Rhee et al. | 523/155 |
| 3,922,241 | 11/1975 | Barker et al. | 524/9 |
| 4,119,591 | 10/1978 | Aldrich | 523/156 |
| 4,197,223 | 4/1980 | Bartram | 523/156 |
| 4,226,759 | 10/1980 | Chester | 523/158 |
| 4,273,699 | 6/1981 | Chester | 260/38 |

OTHER PUBLICATIONS

"Brake Lining Quality Control Test Procedure" SAE J661a, SAE Handbook, 1980, Society of Automotive Engineers, Inc., Warrendale, Pa.
"Friction Identification System for Brake Linings and Brake Blocks for Motor Vehicles", SAE J866a, SAE Handbook, 1980, Society of Automotive Engineers, Inc., Warrendale, Pa.

*Primary Examiner*—Lewis T. Jacobs
*Attorney, Agent, or Firm*—Inez L. Moselle

[57] ABSTRACT

Heat-treated palygorskite clay, such as attapulgite having controlled low moisture and carbonate content, is used with steel wool or other non-asbestos fiber in asbestos-free friction material compositions such as clutch linings, brake pads, truck blocks and the like. These compositions include conventional fillers, lubricants, wear modifiers and the like in order to achieve friction and wear properties comparable to asbestos-based materials.

9 Claims, No Drawings

ASBESTOS-FREE FRICTION MATERIAL INCORPORATING ATTAPULGITE CLAY

BACKGROUND OF THE INVENTION

1. Field of the Invention

This invention relates to friction materials such as clutch linings, brake pads, linings, blocks and the like. More particularly this invention relates to asbestos-free formulations of friction materials which incorporate a palygorskite clay exemplified by attapulgite.

2. Prior Art

Friction material compositions currently used in clutch and brake linings of vehicles, motors and other machinery must be capable of withstanding severe operating temperatures and high pressures experienced during repeated applications. In addition the materials must have surface coefficient of friction suitable to the requirements of the application and must have wear properties to balance the cost of their use and avoid undesirable side effects such as glazing, squeak, fade and grooving in the mating surfaces. Compositions in general use comprise a thermoset binder exemplified by phenolic molding compositions, or novolak resins, a fibrous reinforcement to prevent physical degradation and deterioration in performance, various fillers and other additives including wear modifiers, lubricants, friction modifiers and the like. The fibrous reinforcement in widest use is asbestos. The asbestos provides the phenolic molding composition with superior mechanical and thermal properties but constitutes a health hazard to those exposed to it.

Compositions containing other fibrous reinforcement as an asbestos replacement have been investigated, but such materials have had limited commercial acceptance. When formulating asbestos-free friction materials, end-use properties such as friction coefficient and wear, heat resistance and mechanical strength should be equivalent to asbestos-containing compositions. In addition, processing properties such as moldability and shrinkage should also be equivalent.

In U.S. Pat. No. 3,835,118 to Rhee et al. the use of steel fibers in combination with sponge iron filler to replace asbestos is disclosed. In U.S. Pat. No. 3,922,241 to Barker et al the use of a novolak resin with aluminum silicate (not further defined), talc and cellulose fiber in place of asbestos is disclosed. Other asbestos-free formulations include those disclosed in U.S. Pat. No. 4,119,591 to Aldrich, wherein steel and cellulose fiber are used and carbon fiber, mineral fiber and glass fiber are disclosed; U.S. Pat. No. 4,197,223 to Bartram, in which glass fiber, mineral fiber and cellulose are disclosed as an asbestos replacement, and U.S. Pat. No. 4,226,759 to Chester, in which steel fiber alone is disclosed. In order to meet performance and processing criteria, such as those mentioned above, substituting another material for asbestos is generally not sufficient in itself; rather the overall formulation often requires change or adjustment to meet the demands the product must satisfy.

Thus an object of this invention is to provide a friction material composition formulated without asbestos but having performance and processing characteristics equivalent to existing products made with asbestos.

THE INVENTION

I have discovered that asbestos-free friction material having acceptable performance may be made by using a palygorskite clay, for example one selected from the group attapulgite, sepiolite and mixtures thereof, a non-asbestos fibrous reinforcement and conventional additives such as wear modifiers and lubricants. The non-asbestos fibrous reinforcing material may be steel wool, glass fiber, spun mineral fiber, aramid fiber, or the like and is necessary for cohesiveness and strength.

It is particularly important that a heat-treated grade of a palygorskite clay, e.g. attapulgite, with low volatile matter, especially low carbonate content, be used. When a palygorskite clay not meeting these restrictions is used, the heat generated during operation is sufficient to cause release of volatiles from the clay and subsequent loss of friction properties. Typically, a low volatile matter is understood to mean volatile matter below about 5% by weight on free-moisture-free basis, and low carbonate content is understood to mean a carbonate content below about 5% by weight as carbon dioxide on a free-moisture-free basis.

Although certain aluminosilicates have been used in friction materials as fillers the use of a palygorskite clay in conjunction with an inorganic fibrous material in asbestos-free formulations has heretofore not been practiced or suggested. When used according to the present invention a palygorskite clay of low volatile matter allows less expensive asbestos-free friction materials to be made without loss of performance. Palygorskite clay has good heat resistance and high temperature friction properties, so that much of the non-asbestos fibrous reinforcement, such as steel wool, in asbestos-free friction formulations can be replaced with less expensive palygorskite clay. Palygorskite clay also offers advantages in wet process formability due to a naturally high oil absorption.

DESCRIPTION OF THE PREFERRED EMBODIMENTS

A palygorskite clay suitable for practice of the present invention is attapulgite also known as Attapulgus clay, or Georgia-Florida fuller's earth, which is composed principally of the mineral attapulgite, a crystalline hydrated magnesium aluminum silicate, but which may also contain significant amounts of mineral impurities such as montmorillonite, calcium carbonate, quartz (silica) and feldspar, and in some cases sepiolite. This clay and processing thereof by heat-treatment or calcination to obtain special properties are well known in the art. Further detail on processing and resultant properties is disclosed for example in U.S. Pat. No. 3,953,292 to Burns and U.S. Pat. No. 3,041,238 to Allegrini.

Attapulgite clay may be calcined by means conventional in the art, for example a rotary calciner. Calcination temperatures range from about 400° to 1000° F. Calcination at temperatures in the lower end of the aforementioned range give rise to an attapulgite clay having a total volatile matter of about 16%. This clay is known as an RVM-grade (regular volatile matter) attapulgite clay. The higher temperature calcination gives rise to an attapulgite known as an LVM-grade (low volatile matter) clay of volatile matter of about 5% or below as produced.

The heat-treated mineral readily absorbs moisture from the atmosphere so that free-moisture content may vary widely depending upon conditions of exposure subsequent to processing. As produced an LVM-grade clay has less than about 1% free moisture; as used the free moisture can be 2-3%, with the increase resulting largely from exposure to the ambient atmosphere. In general volatile material is classified according to three levels of thermal treatment: loosely-held water of hydration known as free-moisture which is measured by heating to constant weight at 220° F., structural water that is held chemically in the molecular structure of the clay and is measured by heating from 220° F. to constant weight at 1200° F., and other volatile matter such as inorganic carbonates, principally calcium carbonate, which release $CO_2$ at 1800° F.

Various bases related to water content or thermal treatment may be used to express percentages of components in the clay. A free-moisture-free basis weight, or dry weight, is the weight of the clay after heating to constant weight at 220° F. A volatile-free basis weight is the weight of the clay after heating to constant weight at 1200° F., and a loss-on-ignition or L.O.I. basis weight is determined by heating to constant weight at 1800° F. Also, volatiles content may be expressed on an as received basis.

The difference between loss on ignition weight and volatile-free weight is a fairly accurate representation of carbonate content, since carbonates generally account for virtually all of the non-aqueous volatile matter in the clay. An alternative method for measuring the carbonate content (as % $CO_2$) is to finely pulverize the clay and heat in the presence of a strong mineral acid such as hydrochloric acid to release carbon dioxide. The gas can then be collected and its volume measured, from which the weight percent of $CO_2$ can be calculated. This later method was employed to determine the carbonate content of clays used in the Examples described hereinafter.

Friction materials routinely experience extreme elevated temperatures and volatile matter in the clay must be kept to an acceptable maximum level, otherwise release of volatiles due to high temperature will cause the friction molding to lose desirable friction properties and result in loss of performance or even disintegration. Attapulgite suitable for use in the present invention must be an LVM-grade clay or the equivalent. In addition non-aqueous volatile matter, e.g. carbonates, must be below about 5% by weight as $CO_2$ on a free-moisture-free basis. It is preferred to have % $CO_2$ below about 4% by free-moisture-free weight to minimize the possibility of significant release of volatiles during high temperature use. Low volatile matter heat-treated attapulgite clay is very hygroscopic, and care must be exercised to keep the free moisture content from exceeding about 4% by free-moisture-free weight.

Ultimate particles of attapulgite are needle-shaped in contrast to platelet shapes of other clays such as kaolin. As mined and used the needles are generally agglomerated in irregularly shaped clumps. Particle sizes of the clumps can be altered by conventional pulverization techniques for specific end uses. The particle size may be measured by Sedigraph to give a distribution in terms of equivalent spherical diameter. The particle size does not appear to be a critical parameter in the performance of friction materials of the present invention. Particle size may vary widely, but sizes in the range of about 2 microns average diameter, e.s.d. to about 100 mesh Tyler (149 microns) are preferred.

Attapulgite clay used in the asbestos-free friction materials of the present invention may be formulated with other ingredients by either the wet process or the dry process as practiced in the art. For example, a typical formulation may include, as percentages by weight, the following:

| | |
|---|---|
| Phenolic resin | 20% |
| Attapulgite | 21% |
| Steel Wool | 23% |
| Graphite and other lubricants | 6% |
| Barytes (barium sulfate) filler | 30% |
| | 100% |

Ingredients may be dry mixed (some phenolic resins are available as powders), and molded under pressure and heat using conventional techniques and conditions to form the brake pad or friction material. Phenolic resin may be present in amounts ranging from about 10–40% by weight. In general the percentage of non-asbestos fibrous reinforcement, such as steel wool, may vary from 10–50% by weight and the percentage of attapulgite or other palygorskite clay may vary from about 10% to 35% by weight. The attapulgite and steel wool may range from 20–60% by weight as a combination. The proportion of attapulgite to steel wool or other non-asbestos fiber in the combination may vary widely but generally may be in the range of about 1:3 to 3:1. Especially good results achieved with 1:1 ratio. The percentage of graphite or other wear modifiers may range up to 20%, but the 5–10% range is typically adequate. The filler material, barytes, is a common inexpensive filler material of high density and desirable inertness with good thermal and friction properties. Other filler material such as iron oxide, sponge iron particles, or scavengers such as brass or tin fillings may be included in the formulation. Practioners of the art may add proprietary materials or other materials to achieve desired end results and formulations can vary widely with respect to ingredients and amounts. For example, conventional lubricants or other special wear modifiers may be added to the asbestos-free formulations of the present invention in order to achieve the desired wear properties. Other materials such as polymeric fibers, for example aramid fiber, having a combination of wear reducing and reinforcing properties may be particularly desirable.

The following examples are presented in order to more fully explain and illustrate the invention comprising these novel compositions for friction materials. The examples are not to be construed as limiting the invention.

EXAMPLES 1–12

In order to demonstrate the performance of attapulgite asbestos-free formulations of the present invention friction pads containing various ingredients were molded from dry-mix into shapes suitable for evaluation on a Chase Machine friction tester according to the procedure outlined in SAE J661a as published in the SAE Handbook 1980, pages 31.59 to 31.61, published by the Society of Automotive Engineers, Warrendale, PA. The Chase Machine is equipped to vary the speed and control the temperature and braking force on a rotating drum. Specimen samples are 1 inch square with one flat side and a radius of the working surface conforming to the radius of the drum. Wear is measured by specimen thickness in inches at the center and by weight loss in grams. Coefficient of friction (cold) and coefficient of friction (hot) are classified according to a letter scale described in SAE J866a, page 31.58 in the SAE Handbook (supra).

The following samples containing different ingredients in varying amounts were prepared and evaluated in accordance with the above-described SAE standard tests. Ingredients were dry-blended, placed into a circular mold about four inches in diameter and about ¼-inch thick, and molded on a platen press at 325° F. for 0.5 hours at a pressure of 2000 psi. Test samples of requisite size were then cut from the resulting molded discs. Ingredients in each sample are shown below in Table I.

asbestos grade with "well-open" fiber texture according to Quebec Standard Test rating.

Attapulgite "A" was an LVM-grade attapulgite clay in the range of about 2-3 microns average particle size and had a free moisture content as used of about 3.8% by weight. The volatile matter on a free-moisture-free basis (V.M.$_0$) was about 5.4%. The loss on ignition (L.O.I.) was 10.7% by weight and % $CO_2$ by weight was 2.0. This and other samples of attapulgite clay used in the examples were obtained from a deposit near Attapulgus, Georgia.

Attapulgite "B" was another LVM grade attapulgite

TABLE I

| | FRICTION MATERIAL FORMULATIONS AND CONTROLS | | | | | | | | | | | |
|---|---|---|---|---|---|---|---|---|---|---|---|---|
| | Examples (Amounts in wt. %) | | | | | | | | | | | |
| Ingredient | 1 | 2 | 3 | 4 | 5 | 6 | 7 | 8 | 9 | 10 | 11 | 12 |
| Phenolic Resin | 22.0 | 22.0 | 22.0 | 22.0 | 22.0 | 20.0 | 25.9 | 22.0 | 22.0 | 22.0 | 22.0 | 22.0 |
| Barytes No. 22 | 30.0 | 30.0 | 30.0 | 30.0 | 30.0 | — | 35.3 | 44.0 | 39.0 | 34.0 | 30.0 | 34.0 |
| Steel Wool #1 | 24.0 | 24.0 | 24.0 | 24.0 | 24.0 | — | — | 24.0 | 24.0 | 24.0 | 24.0 | 24.0 |
| Attapulgite "A" | 24.0 | 19.0 | 19.0 | — | 14.0 | — | — | — | — | — | — | — |
| Attapulgite "B" | — | — | — | — | — | — | — | 10.0 | 15.0 | 20.0 | 24.0 | — |
| Attapulgite "C" | — | — | — | — | — | — | — | — | — | — | — | 20.0 |
| Graphite | — | 5.0 | — | — | 10.0 | — | — | — | — | — | — | — |
| Kevlar ® 970 Aramid Fiber | — | — | 5.0 | — | — | — | — | — | — | — | — | — |
| Attapulgite "D" | — | — | — | 24.0 | — | — | — | — | — | — | — | — |
| Cardolite ® NC 104 Resin | — | — | — | — | — | 7.0 | — | — | — | — | — | — |
| Asbestos 5R-04 | — | — | — | — | — | 60.0 | 38.8 | — | — | — | — | — |
| Barytes No. 1 | — | — | — | — | — | 13.0 | — | — | — | — | — | — |
| | 100.0 | 100.0 | 100.0 | 100.0 | 100.0 | 100.0 | 100.0 | 100.0 | 100.0 | 100.0 | 100.0 | 100.0 |

With reference to the ingredients listed in the table, the phenolic resin was SP-8855, a dry powder resin containing hexamethylenetetramine initiator and excess phenol component, available from Schenectady Chemicals Corporation, Schenectady, N.Y. The barytes (No. 22) was a standard grade of barium sulfate of 12 micron average particle size; the No. 1 grade barytes had an average particle size of 8.3 microns. The steel wool was a No. 1 grade, unannealed, having chopped fibers of average length 4 mm, and obtained from Durawool, Incorporated, Queens Village, N.Y. The Kevlar aramid fiber was available from E. I. DuPont de Nemours, Wilmington, Del. The graphite used was #9985 amorphous carbon of 100 mesh (U.S. Sieve Series) average particle size and 80% carbon content available from The Asbury Graphite Mills, Inc., Asbury, N.J. The Cardolite NC 104 resin is a cashew nut oil modified phenolic sold by 3M Company, St. Paul, MN. This fully cured, particulate resin is part of a standard formulation and was about 100 mesh (U.S. Sieve Series) average particle size. The asbestos 5R-04 used was a standard clay of the same average particle size as Attapulgite "A", but having a free moisture as used of about 2.0% by weight, a volatile matter content on a free-moisture-free basis of 4.9%, an L.O.I. of 8.4% by weight and a % $CO_2$ of about 0.9.

Attapulgite "C" was an LVM grade attapulgite clay 100% finer than 200 mesh (U.S. Sieve Series) having a free moisture content as used of 2.8% by weight, a volatile matter on a free-moisture-free basis of about 5.5% by weight, an L.O.I. of about 10.9% by weight and a % $CO_2$ of about 4.5.

Attapulgite "D" was slightly coarser than "C" having particles 100% finer than 100 mesh (U.S. Sieve Series). The free-moisture content as used was 3.2% by weight with a volatile matter content on a free-moisture-free basis of 5.9%, an L.O.I. of about 15.3% by weight and a % $CO_2$ of about 4.1.

Samples of the required size were prepared for Chase Machine testing. Wear and friction characteristics of the twelve samples were measured according to the aforementioned standard tests of the Society of Automotive Engineers. The results appear in Table II below:

TABLE II

| | | | | (SAE J866a) | (SAE J661a) | |
|---|---|---|---|---|---|---|
| | | Wt. % | Wear | Friction | Wear | |
| Example | Attapulgite | Attapulgite | Additive | Classification | Wear (in.) | Wt. Loss (g.) |
| 1 | A | 24 | — | F/F | 0.019 | 0.819 |
| 2 | A | 19 | (5% graphite) | F/F | 0.021 | 0.660 |
| 3 | A | 19 | (5% aramid fiber) | E/F | 0.014 | 0.529 |
| 4 | C | 24 | — | F/F | 0.021 | 0.777 |
| 5 | A | 14 | (10% graphite) | E/E | 0.011 | 0.441 |
| 6 | — | 0 | (asbestos control) | F/F | 0.010 | 0.323 |
| 7 | — | 0 | (asbestos control) | E/F | 0.012 | 0.406 |
| 8 | B | 10 | — | G/G | 0.019 | 0.759 |
| 9 | B | 15 | — | F/G | 0.020 | 0.814 |
| 10 | B | 20 | — | F/G | 0.021 | 0.985 |
| 11 | B | 24 | — | F/E | 0.019 | 0.777 |

TABLE II-continued
WEAR AND FRICTION CHARACTERISTICS OF ATTAPULGITE FRICTION MATERIALS

| Example | Attapulgite | Wt. % Attapulgite | Wear Additive | (SAE J866a) Friction Classification | (SAE J661a) Wear Wear (in.) | (SAE J661a) Wear Wt. Loss (g.) |
|---|---|---|---|---|---|---|
| 12 | D | 20 | — | F/G | 0.020 | 0.854 |

From the data in Table II above it can be seen that attapulgite-substituted asbestos-free friction materials using steel wool can be equivalent in performance to conventional asbestos formulations when aramid fiber or graphite lubricant or combinations thereof are used in the formulation. Particularly good results were realized with Example 5 which contained 14% attapulgite and 10% graphite. The aramid fiber proved to be a more effective lubricant than graphite on a weight basis as shown by Examples 2 and 3, and it has additional reinforcement properties so that some combination of aramid fiber and graphite may be particularly desirable.

The friction classification is related to the coefficient of friction (cold) for the first letter and (hot) for the second. According to SAE J866a (supra), the letter "E" represents a material with coefficient of friction between 0.25 and 0.35; the letter "F" represents a material with coefficient of friction 0.35 to 0.45, and the letter "G" represents the range 0.45 to 0.55. Attapulgite friction materials without wear additives showed higher wear and higher coefficient of friction than the conventional asbestos-filled control samples.

EXAMPLES 13-15

Three other samples of attapulgite clay were used to formulate friction materials, which were subsequently tested on the Chase machine according to SAE J661a. The coefficient of friction during the second fade test from 450° F. to 650° F. was compared to obtain a measure of the fade characteristics of the formulations. The three attapulgite samples, one of which was a regular volatile matter grade, were compared along with Example 1. The formulations of Examples 13-15 were identical to that of Example 1, except in the attapulgite used. The method of preparing samples was identical to that used for Examples 1-12 as mentioned previously.

Example 13 contained an LVM-grade attapulgite clay of the same average particle size as Example 1, and had a free moisture content as used of about 1.6% by weight, a volatile matter content on a free-moisture-free basis of 4.6%, an L.O.I. of 12.1% by weight and a % $CO_2$ of about 5.1.

Example 14 contained an LVM-grade attapulgite clay of the same average particle size as Example 1, and had a free moisture content as used of about 0.7% by weight, a volatile matter content on a free-moisture-free basis of 4.5% an L.O.I. of 8.9 by weight and a % $CO_2$ of about 3.3.

Example 15 contained an RVM-grade attapulgite clay of the same average particle size as Example 1, and had a free moisture content as used of about 5.3% by weight, a volatile matter content on a free-moisture-free basis of 9.8%, an L.O.I. of 17.4% by weight and a % $CO_2$ of about 2.3.

The results of the fade test are shown in Table III below:

TABLE III
FADE TEST ACCORDING TO COEFFICIENT OF FRICTION ON SECOND PASS FADE OF SAE J661a FOR ATTAPULGITE FRICTION MATERIALS

| Formulation | Average Coefficient of Friction at 50° F. | Average Coefficient of Friction at 650° F. | % decrease |
|---|---|---|---|
| Example 13 | 0.55 | 0.33 | 40.0 |
| Example 14 | 0.56 | 0.55 | 1.8 |
| Example 15 | 0.20 | 0.19 | 5.0 |
| Example 1 | 0.42 | 0.36 | 14.3 |

As is evidenced by the above data some slight fade is experienced by Example 1. Very little fade is exhibited by Examples 14 and 15, although Example 15 showed an unacceptably low coefficient of friction, about half that of the other formulations. Example 15 contained the RVM-grade clay and is unsuitable for use in the present invention. Example 13 differed from Example 14 mainly in the % $CO_2$ level of the clay. Example 13 had about 5.1% $CO_2$ and Example 14 had about 3.3% $CO_2$. The initial average coefficients of friction between Examples 13 and 14 are seen to be almost identical, however, Example 13 showed significant and undesirable fade by virtue of a 40% decrease in average coefficient of friction in this test. This fade is attributed to the higher carbonate level of the clay. Both the water and $CO_2$ volatile compounds would tend to be released at the higher temperatures encountered in brake usage, resulting in unacceptable performance. Thus the water, $CO_2$ and any other volatile compounds in the clay, must be controlled to an acceptable level for materials of the present invention to have utility in friction applications.

I claim:

1. A friction material composition suitable for molded friction pads comprising a thermosetting binder, a non-asbestos fibrous material, particles of heat-treated palygorskite clay, said clay having a volatile matter content below about 5% on a free-moisture-free basis and a carbonate content of not more than about 5% $CO_2$ by weight on a free-moisture-free basis, and additional conventional fillers and additives, said composition being substantially free from asbestos and said palygorskite clay being present in amount sufficient to provide acceptable wear and high temperature friction properties.

2. A friction material composition suitable for molded friction pads comprising a thermosetting binder, a non-asbestos fibrous material, particles of heat-treated attapulgite clay having a volatile matter content below about 5% on a free-moisture-free basis and a carbonate content of not more than about 5% $CO_2$ by weight on a free-moisture-free basis, and conventional fillers and additives, said composition being substantially free from asbestos and containing from about 10% to 35% by weight of said attapulgite clay.

3. The composition of claim 1 or 2 wherein said binder is present in amount in the range of 10 to 40% by weight and said non-asbestos fibrous material and said clay are present in combined amount in the range of 20 to 60% by weight.

4. The composition of claim 1 or 2 where said additives comprise friction and wear modifiers.

5. The composition of claim 4 where said wear modifiers comprise organic polymeric fibers and carbon lubricant in amounts sufficient to achieve wear properties comparable to asbestos-formulated friction materials.

6. The composition of claim 1 or 2 wherein said non-asbestos fibrous material is steel wool and comprises from about 10–50% by weight of said composition.

7. The composition of claim 1 or 2 which contains barytes as an additional filler in amount in the range of about 10–40% by weight of said composition.

8. A friction material composition suitable for molded friction pads comprising a thermosetting binder, a non-asbestos fibrous material, particles of heat-treated attapulgite clay, said clay having a volatile matter content below about 5% on a free-moisture-free basis and a carbonate content of not more than about 5% $CO_2$ by weight on a free-moisture-free basis, and additional conventional fillers and additives, said composition being substantially free from asbestos and said attapulgite clay being present in amount sufficient to provide acceptable wear and high temperature friction properties.

9. An asbestos-free friction composition suitable for molded friction pads consisting essentially of 10–40% by weight of a thermosetting binder, 10–50% by weight of a non-asbestos fibrous material, 10 to 35% by weight of particles of heat treated attapulgite clay having a volatile matter content below about 5% by weight on a free-moisture-free basis and a carbonate content of not more than about 5% $CO_2$ by weight on a free-moisture-free basis and conventional fillers such as barytes and conventional friction and wear modifiers in amount sufficient to achieve wear properties equivalent to asbestos-formulated friction materials.

* * * * *